(12) United States Patent
Spaan et al.

(10) Patent No.: US 7,849,605 B2
(45) Date of Patent: Dec. 14, 2010

(54) MEASURING ASSEMBLY AND METHOD FOR DETERMINING THE RELATIVE POSITION OF MACHINE PARTS

(75) Inventors: Henrikus Adrianus Maria Spaan, Beek en Donk (NL); Ivo Widdershoven, Eindhoven (NL)

(73) Assignee: IBS Precision Engineering B.V. (NL)

( * ) Notice: Subject to any disclaimer, the term of this patent is extended or adjusted under 35 U.S.C. 154(b) by 371 days.

(21) Appl. No.: 12/089,492

(22) PCT Filed: Oct. 6, 2006

(86) PCT No.: PCT/NL2006/050249

§ 371 (c)(1),
(2), (4) Date: Jul. 14, 2008

(87) PCT Pub. No.: WO2007/043883

PCT Pub. Date: Apr. 19, 2007

(65) Prior Publication Data

US 2009/0126212 A1 May 21, 2009

(30) Foreign Application Priority Data

Oct. 7, 2005 (NL) .................................... 1030138

(51) Int. Cl.
*G01B 5/004* (2006.01)
(52) U.S. Cl. .......................................... 33/503; 33/502
(58) Field of Classification Search ........... 33/502–503; 73/1.81
See application file for complete search history.

(56) References Cited

U.S. PATENT DOCUMENTS

| 3,869,799 A * | 3/1975 | Neuer et al. ................... 33/561 |
| 4,523,450 A | 6/1985 | Herzog |
| 5,109,609 A | 5/1992 | Anderson |
| 6,513,253 B2 * | 2/2003 | Matsuda et al. ............... 33/502 |
| 2003/0209051 A1 | 11/2003 | McMurtry |

FOREIGN PATENT DOCUMENTS

| EP | 0 253 422 A1 | 1/1988 |
| EP | 0 329 635 A2 | 8/1989 |
| EP | 0 389 108 A2 | 9/1990 |
| EP | 0 429 857 A1 | 10/1990 |
| EP | 0 429 857 A1 | 6/1991 |

OTHER PUBLICATIONS

PCT Written Opinion from International Application No. PCT/NL2006/050249 dated Oct. 6, 2006.

* cited by examiner

*Primary Examiner*—G. Bradley Bennett
*Assistant Examiner*—Tania C Courson
(74) *Attorney, Agent, or Firm*—DeMont & Breyer, LLC

(57) ABSTRACT

The present invention relates to a three-dimensional measuring assembly for determining the relative position of components, such as machine parts and/or instruments. The invention also relates to a method for determining the relative position of components, such as more particularly machine parts, using a reference member according to any of the foregoing claims.

16 Claims, 3 Drawing Sheets

Figure 1:
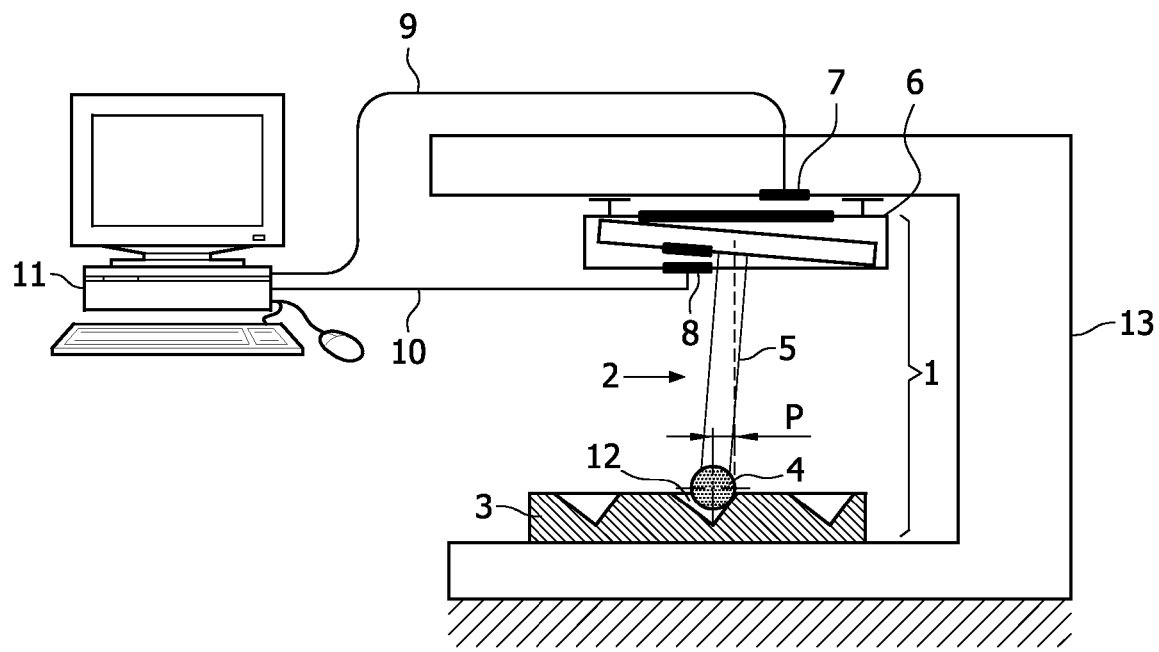

MEASURING ASSEMBLY AND METHOD FOR DETERMINING THE RELATIVE POSITION OF MACHINE PARTS

The present invention relates to a three-dimensional measuring assembly for determining the relative position of components, such as machine parts and/or instruments, in accordance with the preamble of claim 1. The invention also relates to a method for determining the relative position of components, such as more particularly machine parts, using a reference member according to the invention.

Much activity in present-day industry is aimed at the realization of high-precision products. In precision instruments and machines can usually be discerned an interaction of a large number of components, each one of which affects the final inaccuracy due to variations which are the consequence of geometrical, kinematic and dynamic effects. Variations are not only the consequence of the instruments or machine per se; the environment also plays a part (by means of for instance variability in temperature, moisture and vibration). Existing devices for testing and calibrating precision equipment, such as for instance measuring devices based on laser technology, is usually bulky and costly. Such devices cannot therefore be used in smaller equipment, or only with difficulty, and are moreover expensive.

The American U.S. Pat. No. 4,523,450 describes a method for calibrating a probe of complex form provided with a plurality of probe pins, on the outer ends of which are placed balls. Calibration is carried out on a measuring device adapted for this purpose and having multiple degrees of freedom. In the method the balls are brought one by one into contact with a calibration standard also placed in the measuring device; more particularly by placing the balls in centering elements arranged for this purpose in the calibration standard. The calibration standard can be embodied for instance in the form of a block or ball and is provided with centering elements directed toward different sides. Such an unambiguous positioning of the probe relative to the reference member is also referred to as a kinematic placing. The positioning surfaces can be given a flat form, but can also be other than flat, such as for instance curved (concave or convex) or have an otherwise complex form. The positions of the centres of the balls can thus be precisely determined per ball with only a single placing in a centering element. Other than according to the present invention, this is a measuring device with which a probe of complex form, in particular the relative position of the balls, is calibrated. Determining the relative position of machine components is not hereby possible.

The object of the present invention is to provide means for determining, at limited cost, the relative position of components which can also be used in the case of small or very small components without a bulky and complex prior art measuring device being necessary for the purpose. Particularly, though not exclusively, the measurement is envisaged of machine parts with an operating range of less than 500 mm to, even, machine parts with an operating range at nano-level, such as for instance 2.5 D AFM-like machine parts.

The invention provides for this purpose a three-dimensional measuring assembly as according to claim 1. Because the carrying structure of the probe is provided with at least one position detector, it is possible to fix the probe with carrying structure directly to a component for measuring; a measuring device is unnecessary because the probe with carrying structure combines both functions of probing and measuring. A simple probe with integrated measuring means will now suffice instead of a voluminous measuring device. It is desirable for the carrying structure to be embodied such that it can be clamped or fixed in or on a component for measuring. Such a clamping can be simplified by providing the carrying structure with coupling means which can co-act with the components for measuring. A significant advantage of the measuring assembly according to the invention is that the relative position of components, such as for instance machine components, can hereby be measured on site while they are being assembled with the associated machine. Precise measurements are thus possible without components having to be removed for this purpose, displaced to a measuring device and, after being measured, having to be re-placed. In addition to the advantage that measurement with a measuring assembly according to the present invention is much more advantageous logistically and financially, the quality of the measurement results is also superior. This is because the components can be measured in the situation in which they are also employed; the danger of distortion of or adverse effect on the measurement results is, other than in the prior art, absolutely zero. A further advantage is that the probe is relatively simple to manufacture and can therefore also be given a very small form. It is possible to envisage here for instance a spherical contact part in the order of magnitude of a maximum of 0.5 mm, thereby enabling the application of the measuring assembly for very small-scale machine parts. It thus becomes possible to measure, calibrate, gauge, align, control or otherwise process such smaller machine parts, or at least machine parts with a small to very small operating range, with great precision and without time-consuming operations and a bulky and costly measuring device being required for the purpose.

It is also advantageous if the carrying structure of the probe is provided with at least one translation shaft and/or at least one rotation shaft, and at least one position detector which is adapted to detect the position of the relevant shaft. Because of the translation and/or rotation shaft (which may also be referred to as a pivot shaft), the probe can be placed in simple manner in the reference member; the probe can after all thus be urged in more or less self-locating manner (and thus easily) into the unambiguous placing position. The position detector subsequently indicates the position in which the probe is situated, from which data (together with the data of one or more position detectors with which the position is determined in the direction of one or more translation and/or rotation axes) the placing position can be calculated. It is noted that it is recommended in practice to embody the measuring assembly with a plurality of translation and/or rotation shafts, for instance three, with three associated sensors, once again to increase the freedom of movement of the probe, and so increase the freedom of measurement.

The probe is preferably provided with a carrying structure which engages on the spherical contact member and is provided with at least one position detector. Using one or more such position detectors a position in X, Y and/or Z direction (the possible translation axes) can for instance be determined. In a preferred variant it is possible to determine a position in all three of these directions by means of three different position detectors; such a probe does after all have a great freedom of movement and therefore many possibilities in respect of the measurements to be performed. For a good processing of the measured values the position detectors are embodied such that they generate electrical signals which can subsequently be processed in a processing unit (computer). The processing of the data is further enhanced if the probe is provided with an interface for connection of the probe to such a processing unit (computer).

The reference member can be formed relatively simply by a flat plate, in a flat contact side of which at least one reference aperture is arranged. Such a flat plate can usually be readily clamped or fixed in or on a component to be measured. It is not otherwise essential to embody the reference member as a flat plate; an alternative is for instance that the reference apertures are located at different heights in order to thus also obtain multiple reference positions at spaced-apart heights, which for instance allows an accurate calibration of machine parts in height direction (which can for instance be designated as a Z-direction or a vertical direction).

It is also desirable that the reference member is provided with a plurality of reference apertures so that multiple measurements can thus be performed on the same reference member. Only then does it become really possible to precisely determine the relative accuracy of a plurality of successively performed measurements. In practice there will always be at least three, though preferably a still larger number, of reference apertures provided in a single reference member. This is for instance possible by providing the reference member with a matrix of reference apertures defined by intersecting grooves.

A relatively simple and thus inexpensive method of defining reference apertures in the reference member is the use of three mutually intersecting grooves for each reference aperture. Such grooves can intersect each other at an angle of 120° in each case, and the grooves can each be defined by at least two flat grooves sides; a first groove side parallel to the normal of a contact side of the reference member, and a second groove side enclosing an angle of about 35°, preferably 35.26°, with the normal of the contact side of the reference member. The positioning surfaces of the reference apertures are herein defined by three mutually intersecting second groove sides. The positioning surfaces on which the probe can engage are defined in each case at the intersections. As is assumed known, the arranging of grooves is a mechanically simple operation which can also be performed with the necessary great precision. It is also readily possible in this manner to provide the reference member with a matrix of reference apertures defined by grooves.

The present invention also provides a method for determining the relative position of components, such as machine parts, with a reference member as according to any of the foregoing claims, comprising the processing steps of: A) connecting the probe to a first component, B) connecting the reference member to a second component, C) kinematically placing the spherical contact part of the probe in a reference aperture of the reference member, D) recording the relative position of the position variables of the first and second component during the kinematic placing, and E) comparing the recorded position variables to the reference values. The processing steps C) to E) are preferably repeated here several times for different reference apertures arranged in the same reference member. The advantages as already described above in respect of the device according to the present invention can be realized by means of this method.

By comparing the detected position variables and the already known reference values to each other the accuracy of the relative displacement of the first and second component can be determined. It is also possible for the determined accuracy (or inaccuracy) of the first and second component to be fed back to the control means of the first and second component such that the determined variation in the accuracy is at least partially compensated.

Figure 2:
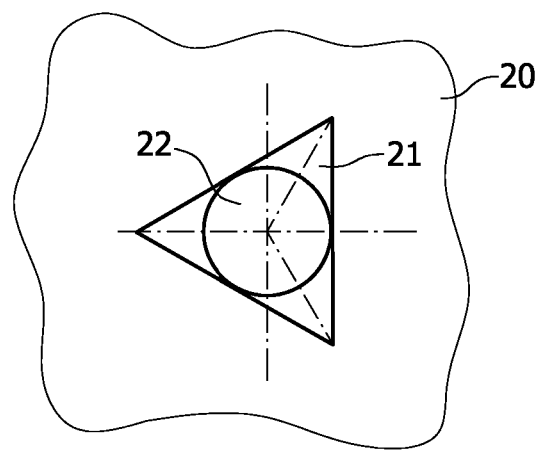
Figure 3A:
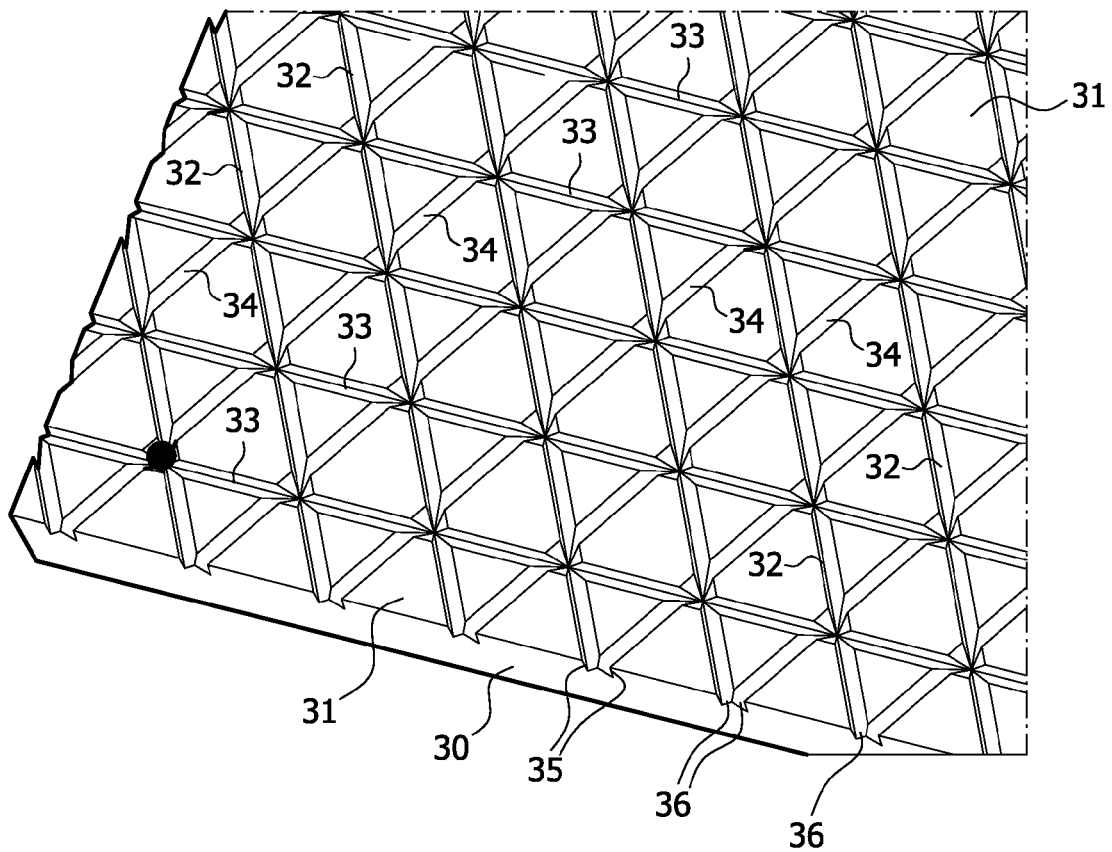
Figure 3B:
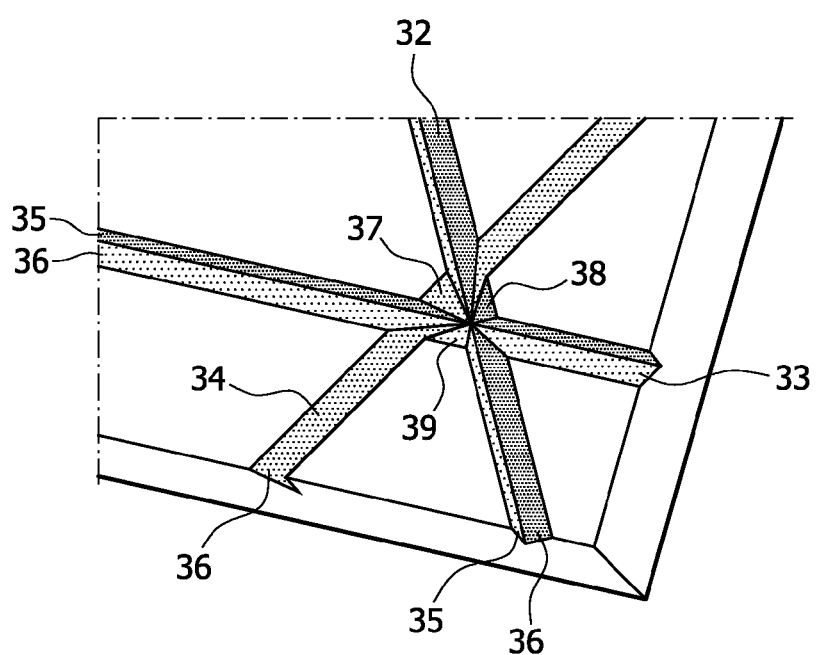
Figure 4:
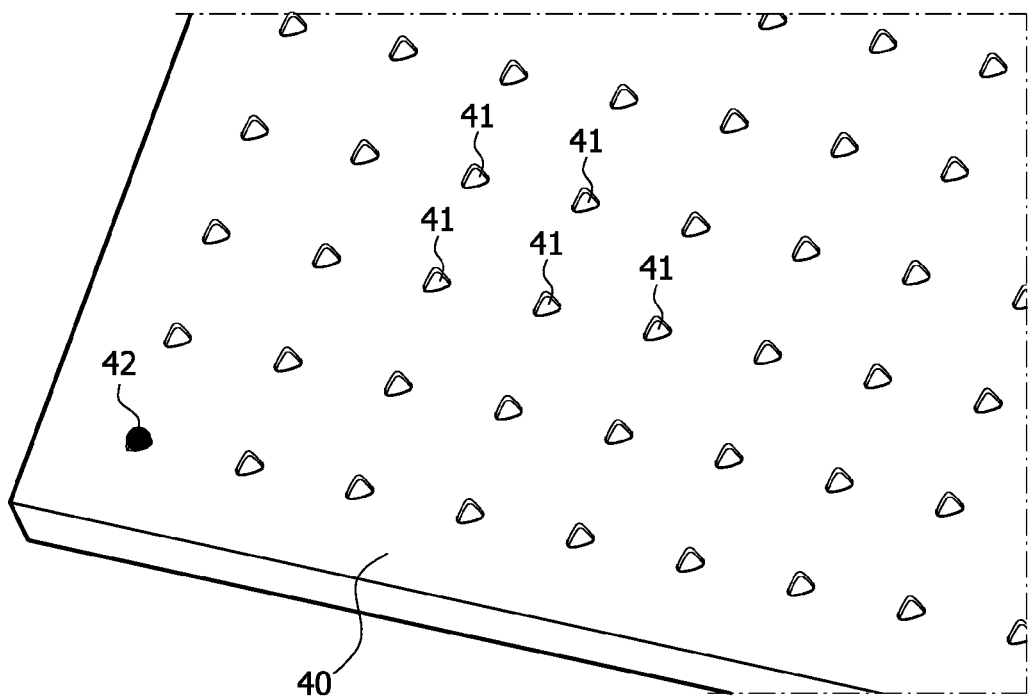
Figure 5:
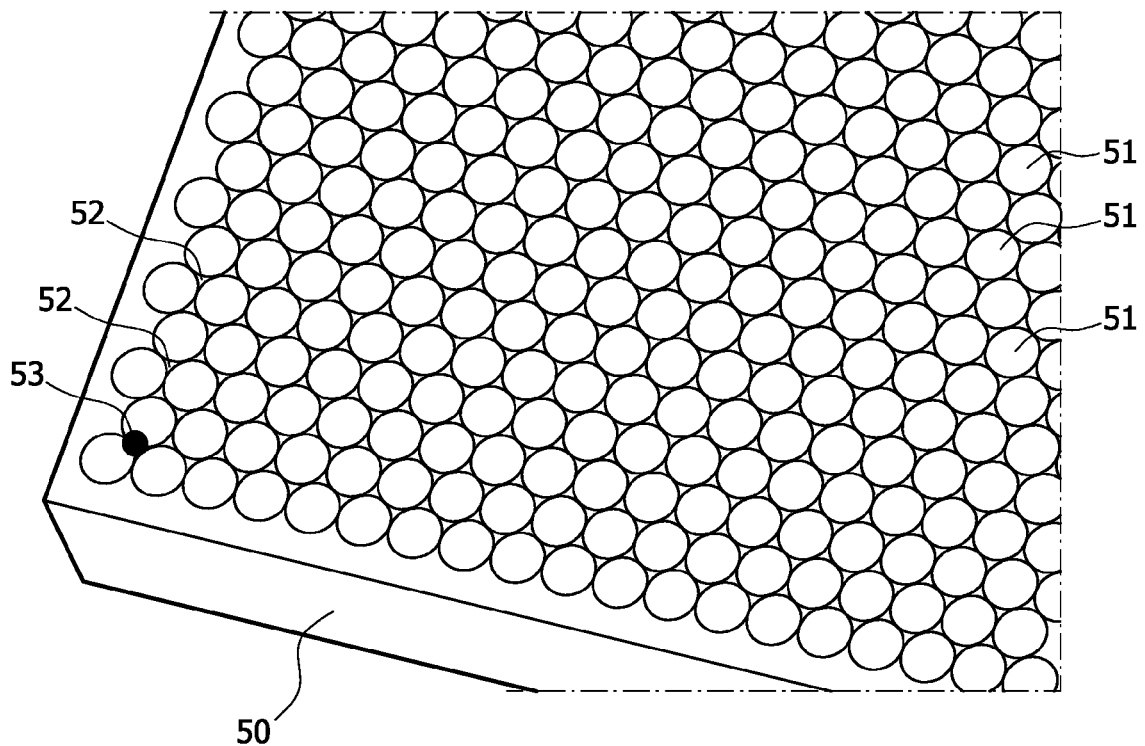

The present invention will be further elucidated on the basis of the non-limitative exemplary embodiments described in the following figures. Herein:

FIG. 1 is a side view of a schematically represented measuring assembly according to the present invention, FIG. 2 is a top view of a spherical contact part of a probe placed kinematically in a reference aperture of a reference member, FIG. 3A is a perspective view of a reference plate with grooves in which a matrix of reference apertures is arranged, FIG. 3B is a perspective detail view of a part of the reference plate shown in FIG. 3A, FIG. 4 is a perspective view of an alternative embodiment variant of a reference plate with a matrix of reference apertures, and FIG. 5 is a perspective view of a second alternative embodiment variant of a reference plate with a matrix of spherical parts defining reference apertures.

FIG. 1 shows a measuring assembly 1 consisting of a probe 2 and a reference plate 3. Probe 2 consists of a spherical contact part 4 which is fixed by means of a carrying arm 5 to a probe frame 6. The displacement of probe frame 6 relative to a machine 13 is detected by means of translation sensors 7, only one of which is shown. Translation sensor 7 will therefore usually at least partially form part of machine 13. Carrying arm 5 is connected pivotally to probe frame 6 and the degree of pivoting is detected by means of rotation sensors 8, only one of which is shown. Both the translation sensors 7 and rotation sensors 8 are disposed such that they can detect displacements in various directions. The measured values recorded by translation sensors 7 and rotation sensors 8 can be fed by means of respective signal lines 9, 10 to a central computer 11. The spherical contact part 4 of probe 2 engages on a reference aperture 12 which is arranged for this purpose in reference plate 3 and which is dimensioned such that the centre of the spherical contact part 4 can be brought at only a single position into a stable position relative to reference aperture 12. The design of reference aperture 12 will be discussed in more detail below.

FIG. 2 shows a top view of a part of a reference plate 20 into which a reference aperture 21 is recessed. A ball-like or spherical contact part 22 is also shown which forms part of a probe which is not further shown in this figure.

FIG. 3A shows a reference plate 30, in a contact surface 31 of which grooves 32, 33, 34 are arranged such that there are always intersections of three grooves 32, 33, 34. The intersecting grooves 32, 33, 34 enclose in all cases mutual angles of 120°. Grooves 32, 33, 34 are each provided with a first groove side 35 which is parallel to the normal of contact surface 31 of the reference plate, and a second groove side 36 which encloses an angle of about 35°, preferably 35.26°, with the normal of contact surface 31 of reference plate 30. See also FIG. 3B for a more detailed view of the intersecting grooves 32, 33, 34. At the position of the location where grooves 32, 33, 34 intersect there are created three contact surfaces 37, 38, 39 (which are part of the second groove sides 36 of grooves 32, 33, 34) on which a spherical contact part will engage kinematically provided it is of sufficiently small dimension).

FIG. 4 shows an alternative embodiment variant of a reference plate 40 in which a matrix of reference apertures 41 is recessed. Reference apertures 41 can for instance be arranged by means of spark erosion or milling. Also included in the figure by way of illustration is a spherical contact part 42 (shown separately of the other part of a probe) which is placed kinematically in a reference aperture 41.

Finally, FIG. 5 shows yet another reference plate 50 on which a matrix of spherical segments 51 is arranged. Three spherical segments 51 define in each case a reference aperture 52. Once again included in the figure by way of illustration is a spherical contact part 53 (shown separately of the other part of a probe) which is placed kinematically in a reference aperture 52.

The invention claimed is:

1. Three-dimensional measuring assembly for determining the relative position of components, such as machine parts, the measuring assembly comprising:
   a probe provided with a spherical contact part and a carrying structure engaging on the spherical contact member,
   a reference member provided with at least one reference aperture defined by three positioning surfaces,
   wherein the probe and the reference member are dimensioned such that the spherical contact part of the probe can be placed in only one way in the reference aperture,
   characterized in that the carrying structure of the probe is provided with at least one position detector.

2. Measuring assembly as claimed in claim 1, characterized in that the carrying structure of the probe is provided with at least one rotation shaft, wherein the at least one position detector is adapted to record the rotation position.

3. Measuring assembly as claimed in claim 1, characterized in that the carrying structure of the probe is provided with at least one translation shaft, wherein the at least one position detector is adapted to record the translation position.

4. Measuring assembly as claimed in claim 1, characterized in that the probe is provided with an interface for connection of the probe to a processing unit.

5. Measuring assembly as claimed in claim 1, characterized in that the reference member is formed by a flat plate, in a flat contact side of which at least one reference aperture is arranged.

6. Measuring assembly as claimed in claim 1, characterized in that the reference member is provided with a plurality of reference apertures.

7. Measuring assembly as claimed in claim 6, characterized in that the reference member is provided with a matrix of reference apertures defined by grooves.

8. Measuring assembly as claimed in claim 1, characterized in that the reference aperture is defined by three positioning surfaces which each enclose an angle of about 35° with the normal of the contact side of the reference member.

9. Measuring assembly as claimed in claim 8, characterized in that the grooves are each defined by at least two flat grooves sides; a first groove side parallel to the normal of a contact side of the reference member, and a second groove side defining a positioning surface.

10. Measuring assembly as claimed in claim 9, characterized in that the positioning surfaces of the reference apertures are defined by three mutually intersecting second groove sides.

11. Measuring assembly as claimed in claim 1, characterized in that the reference apertures are defined by three mutually intersecting grooves.

12. Measuring assembly as claimed in claim 11, characterized in that the three grooves intersect each other at an angle of 120° in each case.

13. Method for determining the relative position of components, such as machine parts, with a measuring assembly as claimed in claim 1, the method comprising:
   A) connecting the probe to a first component,
   B) connecting the reference member to a second component,
   C) kinematically placing the spherical contact part of the probe in a reference aperture of the reference member,
   D) recording the relative position of the position variables of the first and second component during the kinematic placing, and
   E) comparing the recorded position variables to the reference values.

14. Method as claimed in claim 13, characterized in that the processing steps C) to E) are repeated several times for different reference apertures arranged in the same reference member.

15. Method as claimed in claim 13, characterized in that the detected position variables and the already known reference values are compared to each other in order to determine the accuracy of the relative displacement of the first and second component.

16. Method as claimed in claim 15, characterized in that the determined accuracy of the mutual displacement of the first and second component is fed back to the control means of the first and second component such that a determined variation in the accuracy is at least partially compensated.

\* \* \* \* \*